United States Patent [19]

Berg et al.

[11] 4,445,867

[45] May 1, 1984

[54] EDUCATIONAL BOARD GAME

[75] Inventors: Ellie Berg, Chomedy; Joseph Yowfoo, Montreal, both of Canada

[73] Assignee: Jeffrey Fishman, Montreal, Canada

[21] Appl. No.: 314,365

[22] Filed: Oct. 23, 1981

[51] Int. Cl.³ .......................... H63F 9/18; C09B 1/22
[52] U.S. Cl. .................................... 434/404; 40/495; 434/198; 434/207; 434/339; 434/348
[58] Field of Search ............... 434/348, 198, 429, 427, 434/419, 402, 367, 339, 404, 174; 40/495; 273/236, 273

[56] References Cited

U.S. PATENT DOCUMENTS

| | | | |
|---|---|---|---|
| 468,475 | 2/1892 | Sapp | 434/198 |
| 1,453,100 | 4/1923 | Fulgora | 40/495 X |
| 2,567,497 | 9/1951 | Sorensen | 434/198 X |
| 2,591,327 | 4/1952 | Witter et al. | 434/198 |
| 3,605,285 | 9/1971 | Ben Daniel | 434/318 |

FOREIGN PATENT DOCUMENTS

| | | | |
|---|---|---|---|
| 1572944 | 4/1970 | Fed. Rep. of Germany | 434/174 |
| 407078 | 3/1934 | United Kingdom | 434/198 |

Primary Examiner—Richard C. Pinkham
Assistant Examiner—Scott L. Brown
Attorney, Agent, or Firm—Alan Swabey; Robert Mitchell; Guy Houle

[57] ABSTRACT

An educational game comprising in combination: (a) a segmented disc having indicia in at least one of the segments; and (b) a spoke-like configuration pivotally secured to the disc adjacent the center thereof whereby selected segments of the disc can be aligned with the spoke-like configuration, the spoke-like configuration having a plurality of divided areas extending radially and outwardly thereof away from the disc, indicia in at least one of the areas corresponding to that on the segment and further common indicia on the segment and the area. The spoke like configuration and disc can be rotatably and removably mounted on opposite sides of an apertured container.

7 Claims, 15 Drawing Figures

EDUCATIONAL BOARD GAME

BACKGROUND OF INVENTION

1. Field of the Invention

The present invention relates to educational games and particularly to ones for aiding in the teaching of young children. Also, to teaching devices operated individually or under supervision.

2. Description of Prior Art

In a preferred form, the invention relates to a board type game carrying indicia, upon which are detachably and movably mounted disc members also carrying indicia and whereby upon manipulation of the members upon the board, certain information is rapidly provided, and only at a required time. Thus, access to the answer information may be controlled. Various games of the board and disc type are known including ones which provide selected information and ones which function as calculators. Such include for example, that disolosed in Felton's U.S. Pat. No. 3,624,928 dated Dec. 7, 1971, being of the calculator type for teaching arithmetic. A major drawback in regard to the latter is its relative complexity in operation and which is therefore limited to children of a relatively older age group.

Other examples of prior art games having boards, discs, pointers etc., include Nelson's U.S. Pat. No. 3,827,161 dated Aug. 6, 1974; Benson's U.S. Pat. No. 3,239,951 dated Mar. 15, 1966; Buckley's U.S. Pat. No. 2,370,229 dated Feb. 27, 1945; McMahon's U.S. Pat. No. 2,907,123 dated Oct. 6, 1959; Robertson's U.S. Pat. No. 3,756,605 dated Sept. 4, 1973; Thomas's U.S. Pat. No. 2,105,563 dated Jan. 18, 1938 and Kriz's U.S. Pat. No. 2,926,917 dated Mar. 1, 1960.

SUMMARY OF INVENTION

It is therefore a prime object of the present invention to provide a game or teaching device which is relatively simple with respect to construction, simple in operation and whose operation can be controlled, as for example by a parent or teacher, during the answer providing mode.

In one aspect of the present invention there is provided an educational game comprising in combination, a segmented disc having indicia in at least one of said segments; and a spoke-like configuration pivotally secured to said disc adjacent the center thereof whereby selected segments of the disc can be aligned with the spoke-like configuration, said spoke-like configuration having a plurality of divided areas extending radially and outwardly thereof away from said disc, indicia in at least one of said areas corresponding to that on said segment and further common indicia on said segment and said area.

BRIEF DESCRIPTION OF DRAWINGS

The invention is illustrated by way of example in the accompanying drawings wherein.

DESCRIPTION OF PREFERRED EMBODIMENTS

Figures 1, 2:
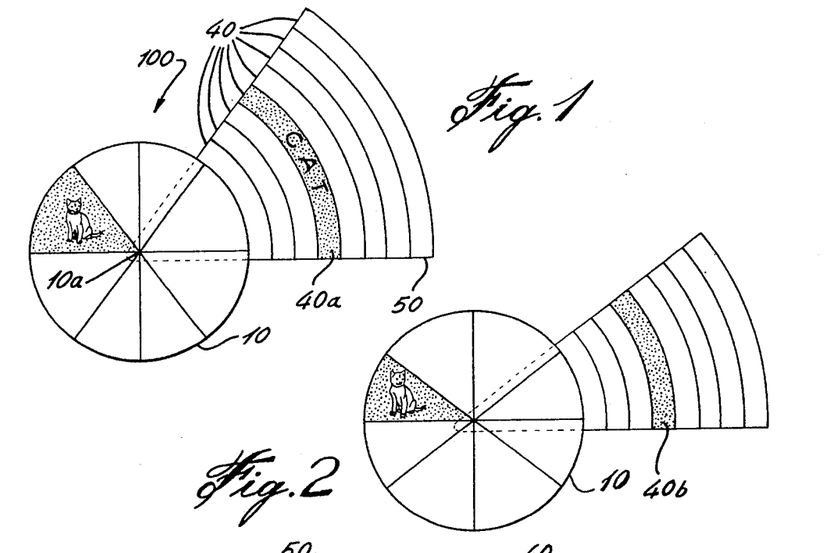
FIG. 1 illustrates a segmented disc pivotally secured to a spoke-like configuration in accordance with the present invention.
FIG. 2 is a view similar to that shown in FIG. 1 including a cover concealing the indicia in the spoke-like configuration, seen in FIG. 1.

Referring now in detail to the drawings, FIG. 1 illustrates the invention in its simplest form and from which it will be seen comprises in combination 100 a segmented question disc 10 and a spoke-like configuration 50. Disc 10, although shown having eight segments, may have more or less segments. Also, for purposes of illustration, indicia, namely a cat, has been indicated in one segment only. It is understood that each segment would normally carry indicia of suitable type, depending upon the subject matter being taught in use of the device. Disc 10, like spoke-like configuration 50, may be constructed from any suitable material including plastics.

Spoke-like configuration 50, pivotally secured to disc 10 via pivot 10a it will be seen, comprises a single spoke having a plurality of divided areas 40 extending radially and outwardly thereof away from disc 10. Again, for purposes of illustration, indicia is shown namely the word CAT in only one of the divided areas. Normally each area would carry suitable indicia corresponding to ones of segmented disc 10, the latter in some instances may be termed a segmented question disc. In the example illustrated, the word corresponds to the illustration in the segment of disc 10.

In addition, further common indicia appears on the segment of disc 10 and the divided area 40a, being in the form of a colour. An alternative to using colour would be to use symbols or a particular pattern, as illustrated by way of example in the drawings.

Pivot 10a is of a suitable detachable type permitting interchange of discs and spoke-like configurations. Thus a variety of disc and spoke-like combinations may be provided, including for example above-mentioned segmented question discs and related spoke-like answer area combination.

Referring once again to FIG. 1 and assuming for purposes of example, eaoh segment of disc 10 carries an illustration of an animal and each area of spoke-like configuration 50 carries the corresponding name of the animal, and each segment of disc 10 carries a colour and the corresponding area of the spoke-like configuration carries the same colour, it will be readily realized a selected positioning of the segments against the spoke-like configuration will provide ready "in-line" reference to the answer information, the common colour acting to guide the child's eye from the segment to the appropriate area of the spoke-like configuration.

As indicated previously, in order to increase interest and inquisitiveness and control the answer information, an operable cover 40b carrying the common colour on its upper surface may be provided over the areas of the spoke-like configuration, as for example illustrated in FIG. 2. Such cover may take any suitable form including for example "velcro" secured peel strips.

From the foregoing it will be realized there is provided a game of simple construction, simple in operation and which may be controlled as for example by a parent, during the answer providing mode.

Figure 3:
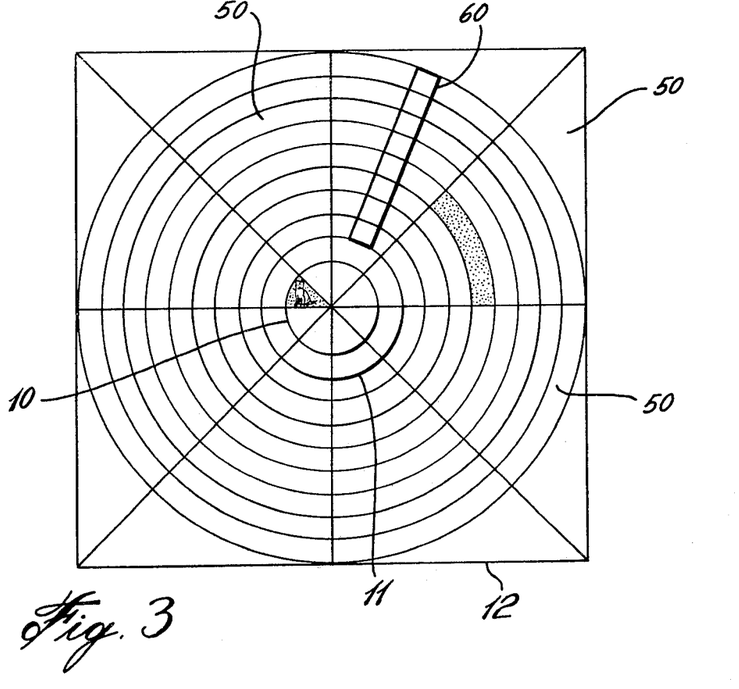
FIG. 3 illustrates a further and a preferred embodiment of the present invention wherein the segmented disc is pivotally mounted upon a board comprising the spoke-like configuration, for each segment of the disc and which includes a cover as seen in FIG. 2.

Reference is now made to FIG. 3 showing one preferred embodiment of the invention having a rectangular shaped board 12 carrying a plurality of spoke-like configurations 50, disc 10 and second segmented disc 11.

Disc 11, like disc 10, may be detachably and pivotally mounted upon board 12. As an alternative construction, disc 11 may be fixed to board 12 or alternatively form part of spoke-like configuration 50. Disc 11 carries a similar number of segments to that of disc 10 and in one mode turns the game into a calculator as will be better understood from the description hereafter. By placing suitable indicia in the segments of discs 10 and 11 and the respective corresponding areas of spoke-like configurations 50, the game can be used for example to multiply and divide numbers.

Figure 3A:
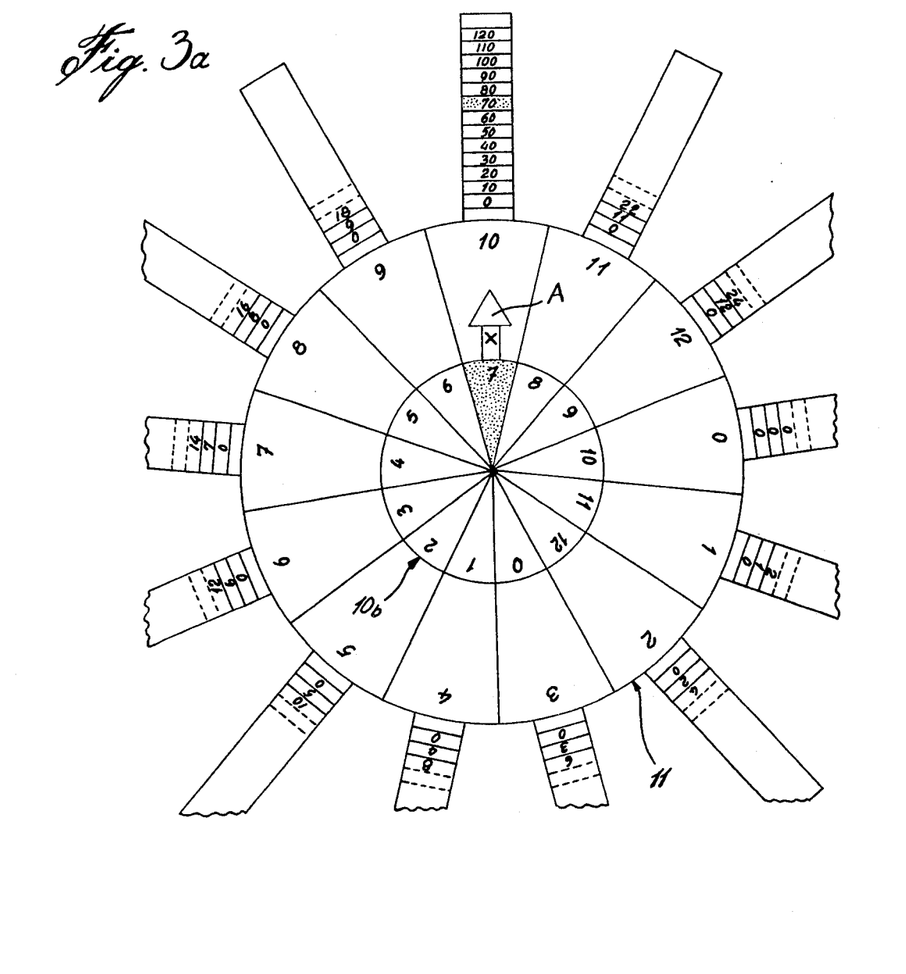
FIG. 3a illustrates a further embodiment of the present invention i.e. as a calculator.

Referring to FIG. 3a such will be seen to show the game as a means to learn multiplication tables. FIGS. 3a thus illustrates "the calculator" aspect. As seen, disc 10b carries 13 segments, disc 11 underlying and extending around the periphery of disc 10 also carries 13 segments. Starting with the aid of pointer A, which is optional, such points to the appropriate selected multiplication table number and accordingly the appropriate spoke-like configuration, and again through colour association using the common indicia colour, the child's eye is directed to the answer, i.e. 7 on disc 10b, times 10 on disc 11, equals answer 70 in the common coloured area of the spoke-like configuration, the same colour appearing in disc 10b of the segment carrying numerals 7. Pointer A, it will be noted in the present instance, includes a multiplication symbol thereon. It is visualized in other game combinations in accordance with the present invention a plurality of discs might be used in conjunction with one another.

From the foregoing and with reference to the drawings it will be understood the appropriate times table will appear in the appropriate spoke-like configuration adjacent the table number appearing in the respective segment i.e. 10 times adjacent segment number 10 of disc 11. The number of segments is thus matched by the like number of areas in each of the spoke-like configurations. Referring again to FIG. 3a, the game illustrates division. Seven on disc 10b goes into 70 on spoke-like configuration (same colour) 10 times as seen on disc 11.

Figure 5:
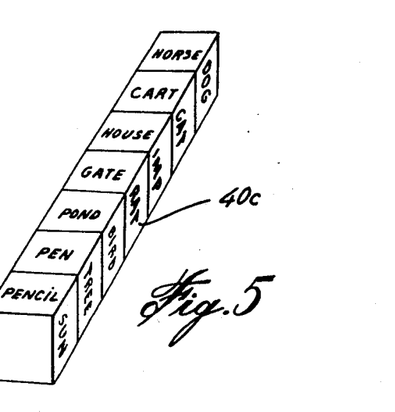
FIG. 5 illustrates a further embodiment of spoke-like configuration in accordance with the present invention and which may be used alternatively to others and which for convenience, is illustrated in one selected position, in FIG. 3.

Referring again to FIG. 3 and the non-calculator mode, in order to facilitate and provide increased subject matter in a compact manner, an elongated block arrangement 60 may be utilized such being illustrated in FIG. 5, having on its 4 sides a plurality of areas 40c, and shown in use on board 12 in FIG. 3. The multi-sided member 60 provides four sets of words which may be used in conjunction with additional discs 10. Securing of the block arrangement 60 to board 12 may be by any suitable means including that of magnets (not shown).

As will be realized from the foregoing and accompanying drawings, the game according to the present invention may be adapted to teach various subject matter including languages, grammar, music etc.

Figure 3B:
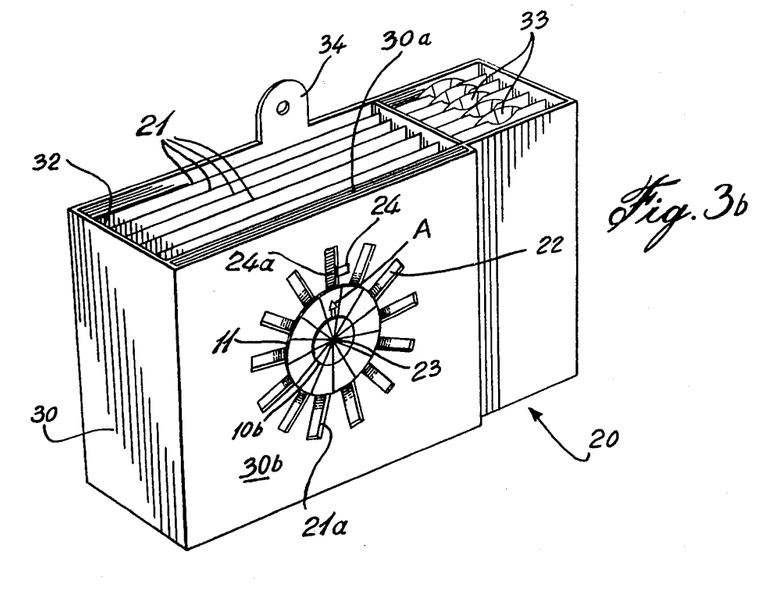
FIG. 3b illustrates a further embodiment of the present invention, similar to that shown in FIG. 3a, and including further features.

Reference is made to FIG. 3b, a further embodiment, showing a game 20 in accordance with the present invention mounted upon a compartmented container 30. For convenience of illustration, the game shown is similar to that disclosed in FIG. 3a.

Figure 3C:
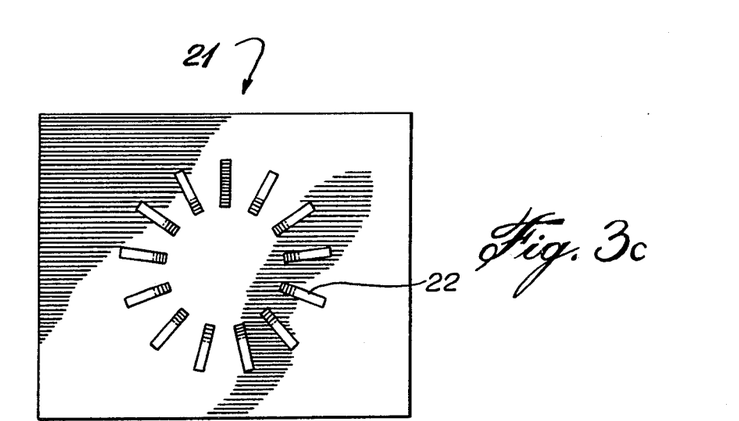
FIG. 3c illustrates a component of the embodiment shown in FIG. 3b.

Referring to FIG. 3b, a plurality of answer sheets 21, which may be of flexible or rigid material comprising a board or alternatively paper sheets, are stored in compartment 32 of container 30. Answer sheets 21 have selected information printed thereon and in the present instance are merely spoke-like arrangements 22 strategically located so as to be seen through elongated spoke-like apertures 21a, in front wall 30b of container 30, when slid into a slot 30a located directly behind front wall 30b. FIG. 3c illustrates diagrammatically a typical answer sheet 21.

In this further embodiment shown in FIG. 3b, pivot pin 23 is not removed during the changing of answer sheets 21, it not being necessary as such does not protrude into slot 30a.

A plurality of hinged covers 24 are provided, such being hingedly mounted to front wall 30b via hinge pin 24a. Thus, with all covers 24 in closed position, elongated apertures 21a are closed and to cover-up information appearing on a selected answer sheet 21 placed in slot 30a. Covers 24 include handles (not shown). Each cover 24 is of similar colour to the respective area it covers, thus each spoke-like configuration contains 13 covers of different colour. Each spoke-like configuration therefore has 13 areas corresponding to the 13 segments of discs 10b and 11, described hereinbefore in respect of FIG. 3a. Disc 11, having non-coloured segments, may be made rotatably movable or alternatively remain fixedly secured on wall 30b. Disc 10b is rotatably mounted on pivot pin 23. As will be realized, discs 10b and 11 may be removed and stored in compartment 33 of container 30, which includes hanging means 34 for use in hanging container 30 and accordingly game 20 upon a wall for either storage or class instruction purposes. Pointer A, described hereinbefore, is provided and may if desired, be reversibly mounted so as to disclose alternative indicia thereon, such pointer being pivotally and detachably mounted upon pivot pin 23.

It will be realized from the foregoing, the embodiment shown in FIG. 3b permits the use of answer sheets 21 made of relatively thin paper or the like, since such are readily supported within slot 30a. Further, it will be realized the container 30 for the answer sheets 21 is an optional feature. If desired, an apertured master board alone, similar to front wall 30b, may be used in conjunction with a selected answer sheet. Alternatively, such similar apertured master board could also include a slot 30a.

Construction details of container 30 have been omitted since it is deemed evident those skilled in the art of manufacturing containers are fully familiar with such construction.

It will thus be appreciated a variety of games in accordance with the present invention can be stored within container 30. Each game it will be realized, from the present disclosure, could have different boards or the like displaying a variety of spoke-like configurations for use in conjunction with appropriate discs.

Figure 4:
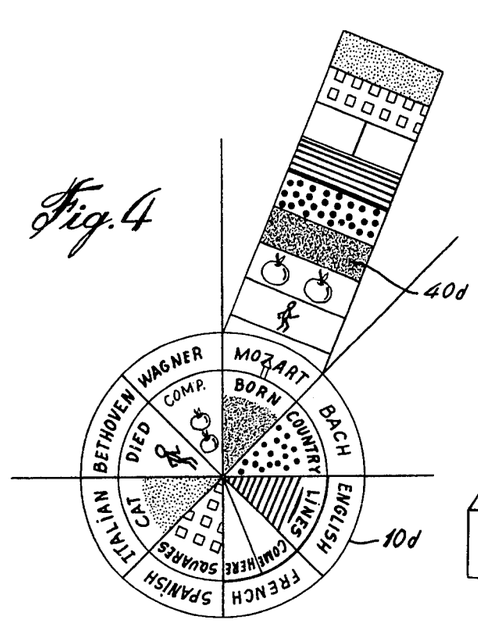
FIG. 4 illustrates a further embodiment of segmented disc and spoke-like configuration in accordance with the present invention.

FIG. 4 merely shows, by way of example, various other subject matter which may appear on discs and spoke-like configurations of the game, which in FIG. 4 are designated respectively 10d and 40d. FIG. 4 further shows the covers in closed position thus obscuring the answer information in the spoke-like configuration.

Figure 6:
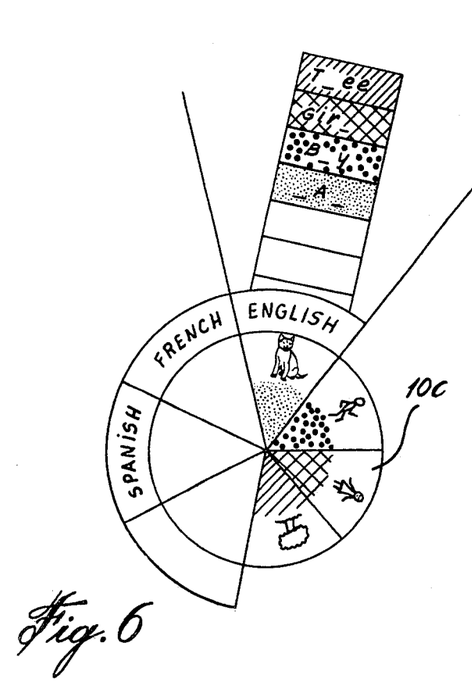
FIGS. 6 and 7 illustrate further embodiments of segmented disc and spoke-like configurations in accordance with the present invention.

Reference is made to FIG. 6 showing additional subject matter which may be utilized on discs and areas of the spoke-like configurations according to the present invention. In such instance, it will be seen letters of words have been deliberately omitted to teach spelling. No pointer is required in such single spoke embodiment, the disc 10c being changed for other lesson material.

Reference has been made to colour as a common indicia to direct the child's eye to the appropriate answer place. As indicated previously, alternative symbols could be used if desired and which may increase interest and alert the user's mind. Games according to the present invention are deemed to teach eye coordination and help rememberance of answers through association with pictures and symbols.

The simple form of game discussed in respect of FIGS. 1 and 2 for example particularly permit the teaching of a concentrated subject as for example to translate English to French. Such embodiment lends itself to use of the block arrangement 60 discussed above. In such instance, the discs could carry English words or phrases and the block arrangement equivalent French words or phrases, a series of symbols or colours would be used as the common coordinating medium for guiding the eye of the user.

Figure 7:
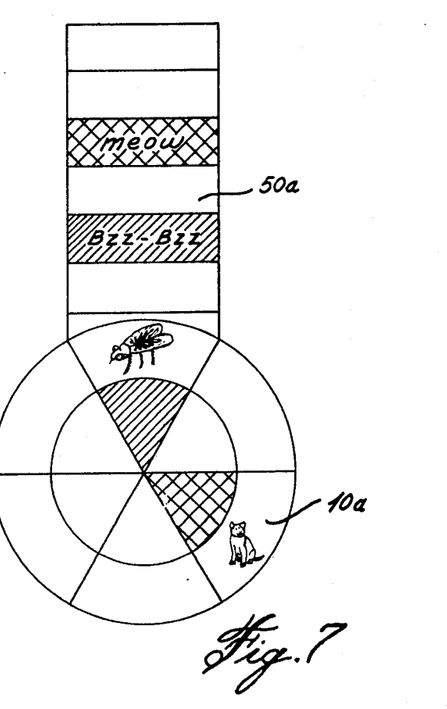

Attention is directed to FIG. 7 showing a further embodiment of the present invention utilizing electronics for operation and sound to coordinate with the subject. In such instance, the segmented disc 10a is rotated by hand so as to align with the spoke-like configuration 50a. When the disc is turned to colour match the segment with the area of the spoke-like configuration, an appropriate sound is heard. Such sound however is only heard following pressing on the appropriate spoke-like configuration area. Thus the answer is a delayed answer and not available until a switch (not shown) is actuated by finger pressure on the appropriate area.

In the mode shown in FIG. 7, a "buzz" is heard representing the sound of a bee. A "meow" is heard when the cat is dialed opposite the spoke-like configuration, again, following depression of the appropriate answer area. The sounds are produced by a tape device (not shown) activated through a suitable switching circuit disc 10a being a turret type switch controlling the various sound circuits, details of which have been omitted, it being understood those familiar with such are well familiar with the construction and means controlling operation of such suitable circuitry discussed. For purposes of convenience only two subject sounds have been illustrated. Many more would normally be utilized and again through interchange of discs, endless numbers of sounds could be provided. The spoke-like configuration as well as the segmented disc may include illumination thereby to signal areas and segments when in use.

Figures 8, 9:
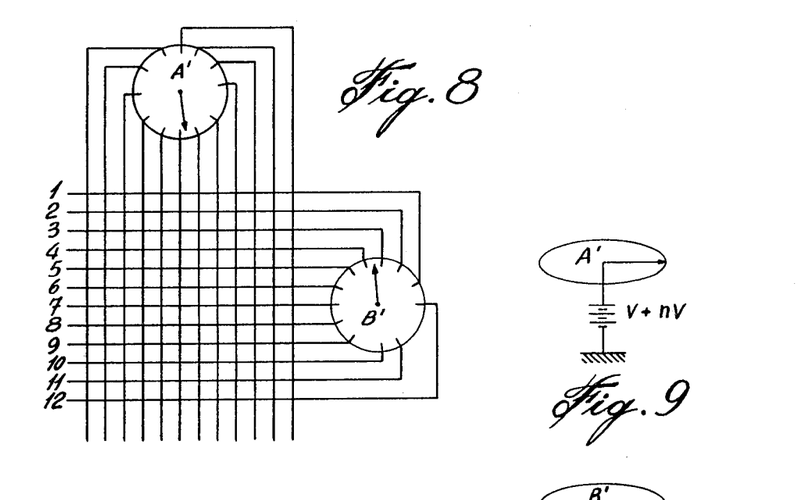
FIGS. 8–12 inclusive comprise electrical schematic diagrams showing typical circuits for use in electrical embodiments according to the invention.
Figures 10, 11, 12:
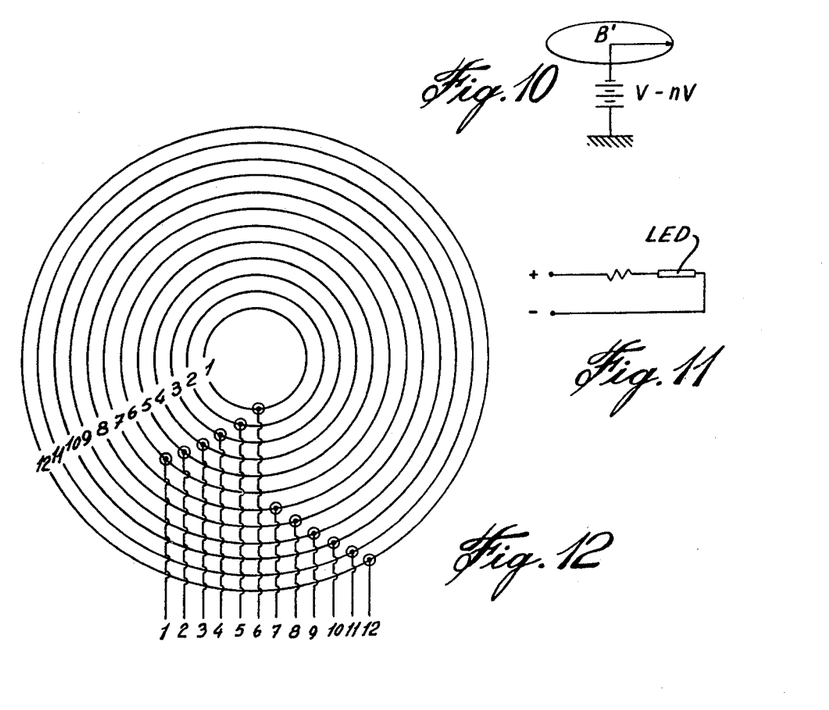

Reference is now made to FIGS. 8–12 inclusive showing typical circuitry which may be utilized in electrical embodiments according to the present invention. Points A' and B' are transposable. The square matrix array of FIG. 8 is transposed for the present purposes into a circular matrix (FIG. 12). The rows become concentric indicia, the columns become radial indicia. In the case of a multiplication mode, for example, with appropriate discs on A', B' and the answer disc, the A' select disc chooses the multiplier when the indicator points to the "number". This charges the corresponding line to the +n volts. The B' select disc chooses the multiplicand when the indicator points to the "number". This charges the corresponding line to the −n volts, at the co-incident of two charged lines, "the answer area" is illuminated by an L.E.D. (light emitting Diode).

For other modes i.e. other indicia, including foreign words for example, such are similarly associated by merely providing the correct transparencies or the like on the answer disc and the questions plus associated relation on A' and B'.

In a further embodiment a quiz game is provided. In such instance the embodiment shown in FIG. 3a might be utilized. The inner disc 10b is spun in one direction and the pointer in the opposite direction. When the pointer comes to rest an answer is given and teams are awarded points at the end of a given time for correct answers checked out.

From the foregoing it will be seen the subject matter of the present invention lends itself to a variety of forms extending from very simple to more sophisticated constructions. As indicated at the beginning hereof, the simplest form is of course particularly important in providing interest and benefit to the younger mind unable to take advantage of the more complicated games of the prior art. Furthermore, the present invention is deemed to provide novel apparatus for aiding in the teaching of persons with speech deficiencies, learning disabilities and hearing problems. Acknowledgement of correct answers requires a simple nod from the teacher or alternatively such apparatus can be operated by such persons alone, and which require a minimum of skill.

We claim:
1. An educational game comprising in combination:
   at least one pivotally mounted segmented disc having first indicia in at least one of said segments;
   at least one spoke-like configuration arranged to extend radially outwardly of said disc whereby segments of said disc may be aligned with said spoke-like configuration, said spoke-like configuration having a plurality of areas extending in tandem radially outwardly of said disc;
   second indicia in one of said areas corresponding to that of said segment and further common indicia in said segment and said area;
   said game including a container, said spoke-like configuration appearing on a sheet or a like member removably mounted in said container, said container including a wall apertured in such manner said spoke-like configuration is visible therethrough and said disc being removably mounted exteriorly of said wall.

2. An educational game as defined in claim 1, wherein a plurality of said spoke-like configurations are arranged to extend radially outwardly of said disc.

3. An educational game as defined in claim 1, wherein two of said segmented discs are provided and mounted on a common pivot axis, one disc being of larger diameter than the other, with the smaller diameter one overlying the larger diameter one.

4. An educational game as defined in claim 1, including a plurality of covers adapted to selectively expose or conceal individually said areas of said spoke-like configuration, each of said covers having a different indicia thereon one to another, and visible when in concealing position, said indicia on said covers being in common respectively with indicia in said segments.

5. An educational game as defined in claim 1, including a plurality of said discs and sheets for interchangeably mounting with ones respectively on and in said container whereby to provide a variety of combinations.

6. An educational game comprising in combination;
(a) a container, said container having a wall with an elongated spoke-like aperture therein;
(b) a segmented disc removably mounted for rotation on said wall exteriorly thereof, such that said spoke-like aperture extends radially of the center of said disc and the segments of said disc may be selectively aligned with said spoke-like aperture upon rotation of said disc;
(c) a removably mounted sheet or a like member in said container and having a spoke-like configuration thereon, said configuration being arranged so as to be visible through said aperture, said configuration including at least two areas extending in tandem and radially of said disc;
(d) first indicia in one of said areas corresponding to first indicia on one of said segments; and
(e) second indicia in said area commonly corresponding to second indicia on said segment.

7. A game as defined in claim 6, including covers adapted to selectively expose or conceal individually said areas of said spoke-like configuration, said cover having said second indicia thereon and visible when disposed in concealing position.

* * * * *

UNITED STATES PATENT AND TRADEMARK OFFICE
CERTIFICATE OF CORRECTION

PATENT NO. : 4,445,867
DATED : May 1, 1984
INVENTOR(S) : Ellie Berg et al.

It is certified that error appears in the above-identified patent and that said Letters Patent is hereby corrected as shown below:

On the title page, Item [73] should read

-- [73] Assignee: Ellie Berg, Chomedy and Jeffrey Fishman, Montreal, Canada, part interest --.

Signed and Sealed this

Twenty-third Day of October 1984

[SEAL]

Attest:

GERALD J. MOSSINGHOFF

Attesting Officer

Commissioner of Patents and Trademarks